United States Patent
Arnston et al.

(10) Patent No.: US 7,165,630 B2
(45) Date of Patent: Jan. 23, 2007

(54) METHODS FOR MANUFACTURING OPERATIONS USING NON-CONTACT POSITION SENSING

(75) Inventors: Paul R. Arnston, Bothell, WA (US); Ronald W. Outous, Shoreline, WA (US); Theodore M. Boyl-Davis, Snohomish, WA (US); James N. Buttrick, Jr., Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/165,730

(22) Filed: Jun. 23, 2005

(65) Prior Publication Data

US 2005/0251985 A1 Nov. 17, 2005

Related U.S. Application Data

(62) Division of application No. 10/606,473, filed on Jun. 25, 2003, now Pat. No. 6,926,094.

(51) Int. Cl.
 *B23B 35/00* (2006.01)
 *B23P 3/157* (2006.01)
(52) U.S. Cl. .................... 173/1; 173/32; 408/13; 408/234; 408/237; 29/34 B
(58) Field of Classification Search .............. 173/1, 173/32; 29/34 B; 408/13, 76, 234, 237, 408/178
See application file for complete search history.

(56) References Cited

U.S. PATENT DOCUMENTS

| 1,676,206 A | 7/1928 | Ratliff |
| 1,741,044 A | 12/1929 | Whipple et al. |
| 2,151,205 A | 3/1939 | Hawn |
| RE21,795 E | 5/1941 | Verderber |
| 2,911,860 A | 11/1959 | Winslow et al. |
| 2,946,246 A | 7/1960 | Allan |
| 2,963,927 A | 12/1960 | Hanger |
| 3,156,126 A | 11/1964 | Olsen |
| 3,348,248 A | 10/1967 | Milkert |
| 3,456,738 A | 7/1969 | Harry |
| 3,575,364 A | 4/1971 | Frederick |
| 3,592,095 A | 7/1971 | Passa et al. |

(Continued)

FOREIGN PATENT DOCUMENTS

DE 19834702 A1 2/2000

(Continued)

*Primary Examiner*—Brian Nash
(74) *Attorney, Agent, or Firm*—Lee & Hayes, PLLC

(57) ABSTRACT

Apparatus and methods for manufacturing operations using non-contact position sensing are disclosed. In one embodiment, an apparatus includes a track assembly adapted to be attached to a workpiece, a carriage assembly moveably coupled to the track assembly and moveable relative to the workpiece, and a position sensor. The position sensor includes a sensor element adapted to detect at least one edge of an index feature on the workpiece from a distance away from the index feature. In an alternate embodiment, the position sensor may include a sensing circuit that receives an analog signal from the sensing element and provides both analog and digital output signals. In another embodiment, a controller that controls manufacturing operations may be mounted directly on the carriage assembly.

35 Claims, 7 Drawing Sheets

U.S. PATENT DOCUMENTS

| | | |
|---|---|---|
| 3,599,958 A | 8/1971 | Schindler et al. |
| 3,627,436 A | 12/1971 | Adams et al. |
| 3,633,433 A | 1/1972 | Schurch |
| 3,663,115 A | 5/1972 | Vindez et al. |
| 3,732,608 A * | 5/1973 | Knopf .................... 29/407.05 |
| 3,772,930 A | 11/1973 | Lamport et al. |
| 3,851,536 A | 12/1974 | Zeldman |
| 3,874,244 A | 4/1975 | Rasmussen et al. |
| 3,878,734 A | 4/1975 | Zeldman et al. |
| 3,935,985 A | 2/1976 | Prudhomme et al. |
| 4,031,931 A | 6/1977 | Balcombe |
| 4,091,712 A | 5/1978 | Geiger |
| 4,123,187 A | 10/1978 | Turner |
| 4,149,822 A | 4/1979 | Lehmkuhl |
| 4,268,949 A * | 5/1981 | Sato .............................. 483/7 |
| 4,353,308 A | 10/1982 | Brown |
| 4,388,890 A | 6/1983 | Wester et al. |
| 4,396,318 A | 8/1983 | Jensen et al. |
| 4,468,159 A | 8/1984 | Oster |
| 4,520,684 A | 6/1985 | Meyer et al. |
| 4,561,814 A | 12/1985 | Dahlgren et al. |
| 4,570,542 A | 2/1986 | Cable et al. |
| 4,591,301 A | 5/1986 | Pelfrey |
| 4,599,018 A | 7/1986 | Woods |
| 4,686,397 A | 8/1987 | Becker |
| 4,720,897 A | 1/1988 | Orrell et al. |
| 4,740,117 A | 4/1988 | Schaff Deleury et al. |
| D297,144 S * | 8/1988 | Kazlauskas ................ D15/144 |
| 4,761,876 A | 8/1988 | Kosmowski |
| 4,778,317 A | 10/1988 | Earle, II et al. |
| 4,787,786 A | 11/1988 | Freud et al. |
| 4,850,763 A | 7/1989 | Jack et al. |
| 4,932,814 A | 6/1990 | York |
| 4,958,967 A | 9/1990 | Adachi |
| 5,032,051 A | 7/1991 | Gilmore |
| 5,062,746 A | 11/1991 | Deremo |
| 5,070,792 A * | 12/1991 | Harris ........................ 105/29.1 |
| 5,072,948 A | 12/1991 | Kosrzewski |
| 5,129,865 A | 7/1992 | Brock et al. |
| 5,173,015 A | 12/1992 | Maynard |
| 5,297,907 A | 3/1994 | Strait et al. |
| 5,323,962 A | 6/1994 | Jassby et al. |
| 5,348,429 A | 9/1994 | Pfister |
| 5,352,069 A | 10/1994 | Rourke |
| 5,383,751 A | 1/1995 | Wheetley et al. |
| 5,390,557 A | 2/1995 | Tsukada |
| 5,395,187 A | 3/1995 | Slesinski et al. |
| 5,403,133 A | 4/1995 | Kim |
| 5,437,580 A | 8/1995 | Doring |
| 5,468,099 A | 11/1995 | Wheetley et al. |
| 5,477,597 A | 12/1995 | Catania et al. |
| 5,482,411 A | 1/1996 | McGlasson |
| 5,537,927 A | 7/1996 | Rogovein et al. |
| 5,542,796 A | 8/1996 | Bratten et al. |
| 5,573,076 A | 11/1996 | McCannon, Jr. |
| 5,582,067 A | 12/1996 | Snider |
| 5,609,444 A | 3/1997 | Valsecchi |
| 5,661,892 A | 9/1997 | Catania et al. |
| 5,664,311 A * | 9/1997 | Banks et al. ............. 29/407.04 |
| 5,697,413 A | 12/1997 | Fuller |
| 5,934,848 A | 8/1999 | Hamalainen |
| 6,007,278 A | 12/1999 | Arsenault |
| 6,036,409 A | 3/2000 | Rissler |
| 6,073,326 A | 6/2000 | Banks et al. |
| 6,210,084 B1 | 4/2001 | Banks et al. |
| 6,220,099 B1 | 4/2001 | Marti et al. |
| 6,240,332 B1 | 5/2001 | Buttrick et al. |
| 6,283,684 B1 | 9/2001 | Jarvis |
| 6,309,145 B1 | 10/2001 | Tremblay et al. |
| 6,334,745 B1 | 1/2002 | Bennett, Sr. |
| 6,357,101 B1 | 3/2002 | Sarh et al. |
| 6,382,889 B1 | 5/2002 | Brown et al. |
| 6,413,022 B1 | 7/2002 | Sarh |
| 6,428,452 B1 | 8/2002 | Dahlstrom et al. |
| 6,428,453 B1 | 8/2002 | Hoppe et al. |
| 6,430,796 B1 | 8/2002 | Jones et al. |
| 6,439,813 B1 | 8/2002 | Repossini |
| 6,467,385 B1 | 10/2002 | Buttrick et al. |
| 6,494,307 B1 | 12/2002 | Kozak et al. |
| 6,505,393 B2 | 1/2003 | Stoewer et al. |
| 6,547,496 B2 | 4/2003 | Chun et al. |
| 6,550,129 B1 | 4/2003 | Buttrick, Jr. |
| 6,612,792 B2 | 9/2003 | Barclay |
| 6,634,838 B2 | 10/2003 | Kitamura et al. |
| 6,796,014 B2 | 9/2004 | Sarh |
| 6,843,328 B2 | 1/2005 | Boyl-Davis et al. |
| 6,855,099 B2 | 2/2005 | Hazlehurst et al. |
| 6,902,362 B2 | 6/2005 | Ferrari et al. |
| 6,926,094 B2 | 8/2005 | Arntson et al. |
| 2002/0001511 A1 | 1/2002 | Reguzzi |
| 2002/0127069 A1 | 9/2002 | Luigi |
| 2002/0168241 A1 | 11/2002 | David et al. |
| 2003/0207742 A1 | 11/2003 | Hazlehurst et al. |
| 2004/0076484 A1 | 4/2004 | Alam et al. |
| 2004/0234352 A1 | 11/2004 | Vanderpol et al. |
| 2004/0245879 A1 | 12/2004 | Hirzel et al. |
| 2005/0158134 A1 | 7/2005 | Roders |

FOREIGN PATENT DOCUMENTS

| | | |
|---|---|---|
| JP | 55-120910 | 9/1980 |
| JP | 58028442 | 2/1983 |
| JP | 401064711 A0 | 3/1989 |
| JP | 01210207 | 8/1989 |
| JP | 05318215 | 12/1993 |
| JP | 05318218 | 12/1993 |

* cited by examiner

METHODS FOR MANUFACTURING OPERATIONS USING NON-CONTACT POSITION SENSING

CROSS REFERENCE TO RELATED APPLICATIONS

This patent application is a divisional application of commonly-owned U.S. patent application Ser. No. 10/606, 473, filed on Jun. 25, 2003, now U.S. Pat. No. 6,926,094, entitled "Apparatus and Methods for Manufacturing Operations Using Non-Contact Position Sensing," which is related to commonly-owned U.S. patent application Ser. No. 10/016,524 entitled "Flexible Track Drilling Machine" filed Dec. 10, 2001, and to the following commonly-owned U.S. patent applications filed on Jun. 25, 2003: U.S. patent application Ser. No. 10/606,443 entitled "Methods and Apparatus for Counterbalance-Assisted Manufacturing Operations", U.S. patent application Ser. No. 10/606,472 entitled "Apparatus and Methods for Manufacturing Operations Using Opposing-Force Support Systems", U.S. patent application Ser. No. 10/606,625 entitled "Methods and Apparatus for Track Members Having a Neutral-Axis Rack", and U.S. patent application Ser. No. 10/606,402 entitled "Apparatus and Methods for Servo-Controlled Manufacturing Operations."

FIELD OF THE INVENTION

The present disclosure relates to apparatus and methods for manufacturing operations using non-contact position sensing.

BACKGROUND OF THE INVENTION

The fabrication of large structures may involve the performance of a large number of manufacturing operations on the structure, such as the drilling of a large number of holes. Conventional structures that require a large number of manufacturing operations include, for example, aircraft, missiles, ships, railcars, sheet metal buildings, and other similar structures. In particular, conventional aircraft fabrication processes typically involve the drilling of a large number of holes in wing sections of the aircraft to allow these sections to be attached to each other and to the airframe.

A variety of devices have been developed to facilitate drilling operations involving the drilling of a large number of holes. For example, U.S. Pat. No. 4,850,763 issued to Jack et al. discloses a drilling system that includes a pair of rails temporarily attached to an aircraft fuselage. A support carriage is slideably coupled to the rails and supports a drill assembly. A template attached to the aircraft fuselage provides an indication of the desired locations of the holes that are to be formed in the aircraft fuselage. As the carriage is moved along the rails, a locking mechanism (or trigger) interacts with the template to securely position the carriage for a subsequent drilling operation.

Although desirable results have been achieved using the prior art drilling systems, there is room for improvement. For example, prior art assemblies typically need to be carefully oriented on the workpiece prior to performing manufacturing operations to ensure that the manufacturing operations are performed in the proper locations. Orienting the prior art assemblies on the workpiece may require physical contacts between the support carriage or other portions of the assembly and one or more contact points on the workpiece. Such physical contacts may be subject to degradation, especially through repeated usage, and may also adversely impact the quality of some types of workpiece surfaces. Therefore, a need exists for an improved position orientation system for performing manufacturing operations on a workpiece.

Furthermore, prior art manufacturing assemblies typically include a controller that is positioned remotely from the support carriage that supports a tool assembly over the workpiece, as disclosed, for example, in U.S. Pat. No. 6,550,129 B1 issued to Buttrick and U.S. Pat. No. 6,073,326 issued to Banks et al. In such systems, control signals for commanding movement of the support carriage and for controlling manufacturing operations using the tool assembly are transmitted via a system of control cables that extend between the remotely-positioned controller and the components of the support carriage and the tool assembly. Although desirable results have been achieved using such manufacturing assemblies, the extent of movement of the support carriage and the operation of the tool assembly may be limited by the lengths of the control cables or by the mobility of the controller within the confines of the manufacturing environment.

SUMMARY OF THE INVENTION

The present invention is directed to apparatus and methods for manufacturing operations using position sensing. Apparatus and methods in accordance with the present invention may advantageously improve the accuracy, efficiency, and throughput of manufacturing operations on a workpiece.

In one embodiment, an apparatus for performing a manufacturing operation on a workpiece includes a track assembly adapted to be attached to the workpiece, a carriage assembly moveably coupled to the track assembly and moveable relative to the workpiece, and a position sensor. The position sensor is operatively coupled to the carriage assembly and includes a sensor element adapted to be operatively positioned relative to the workpiece. The sensor element is further adapted to detect at least one edge of an index feature on the workpiece from a distance away from the index feature. Because the sensor element detects an edge of the index feature from a distance away from the index feature, the sensor element advantageously does not physically contact the index feature, and may therefore provide improved reliability and maintainability in comparison with prior art systems.

In another embodiment, an apparatus for performing a manufacturing operation on a workpiece includes a track assembly adapted to be attached to the workpiece, a carriage assembly moveably coupled to the track assembly and moveable relative to the workpiece, and a position sensor operatively coupled to the carriage assembly. The position sensor includes a sensor element adapted to be operatively positioned relative to the workpiece, and a sensing circuit having a first portion coupled to the sensing element, the first portion being adapted to receive an analog input signal and provide a conditioned analog output signal on a first output node. The sensing circuit further includes a second portion coupled to the first portion and adapted to receive the conditioned analog output signal and to provide a digital output signal on a second output node. Thus, the sensor element advantageously provides both analog and digital output signals to the relevant controller apparatus, thereby improving the versatility and accuracy of the manufacturing system.

In a further embodiment, an apparatus for performing a manufacturing operation on a workpiece including a track assembly adapted to be attached to the workpiece, a carriage assembly moveably coupled to the track assembly and including a drive assembly operable to translate the carriage assembly along the track assembly, and a controller mounted on the carriage assembly and operatively coupled to the drive assembly. The controller is adapted to transmit control signals to the drive assembly to control movement of the carriage assembly over the workpiece. Because the controller is mounted on the carriage assembly, the carriage assembly may operate autonomously to perform manufacturing operations on the workpiece, and the amount of support equipment may be reduced.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for manufacturing operations using position sensing. Many specific details of certain embodiments of the invention are set forth in the following description and in FIGS. 1–12 to provide a thorough understanding of such embodiments. One skilled in the art, however, will understand that the present invention may have additional embodiments, or that the present invention may be practiced without several of the details described in the following description.

Figure 1:
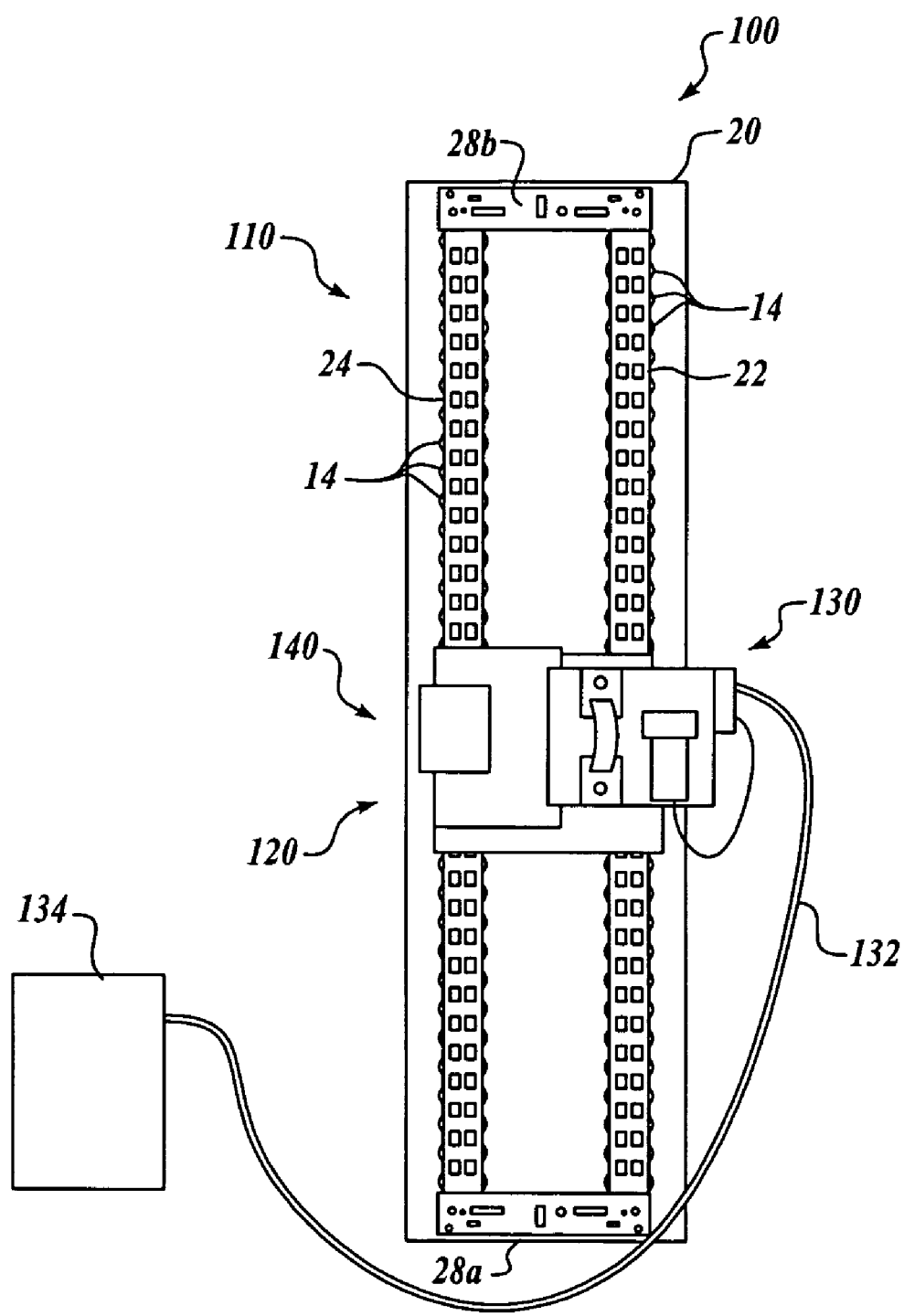
FIG. 1 is a front elevational view of a manufacturing assembly having a position sensor assembly in accordance with an embodiment of the invention.

FIG. 1 is a front elevational view of a manufacturing assembly 100 having a position sensor assembly 140 in accordance with an embodiment of the invention. In this embodiment, the manufacturing assembly 100 includes a track assembly 110 attachable to a workpiece 20, and a carriage assembly 120 moveably coupled to the track assembly 110. A controller 130 is operatively coupled to the position sensor assembly 140 and to the carriage assembly 120. As described more fully below, the manufacturing assembly 100 having the position sensor assembly 140 may advantageously improve the accuracy and efficiency of manufacturing operations performed on the workpiece 20.

Figure 2:
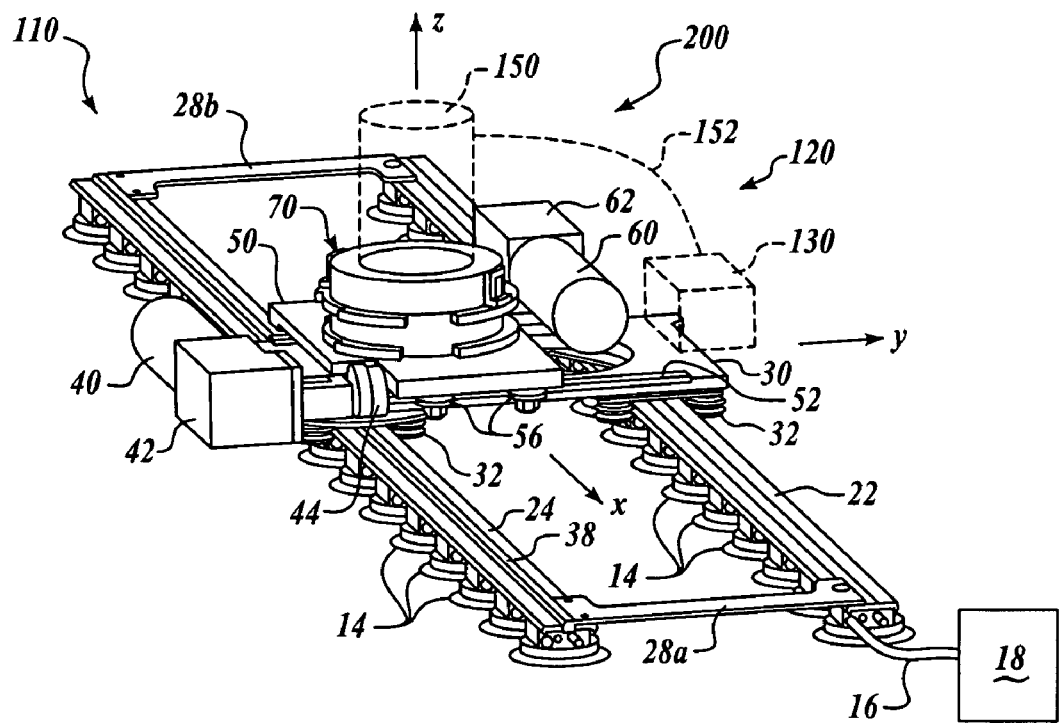
FIG. 2 is an upper isometric view of a track assembly and a carriage assembly of the manufacturing assembly of FIG. 1.
Figure 3:
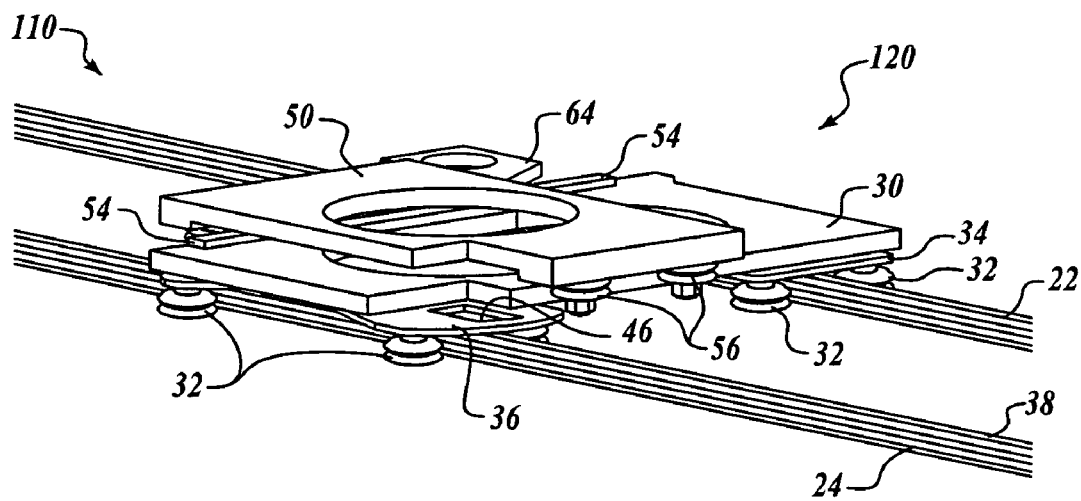
FIG. 3 is another upper isometric view of the track assembly and a portion of the carriage assembly of FIG. 2.
Figure 4:
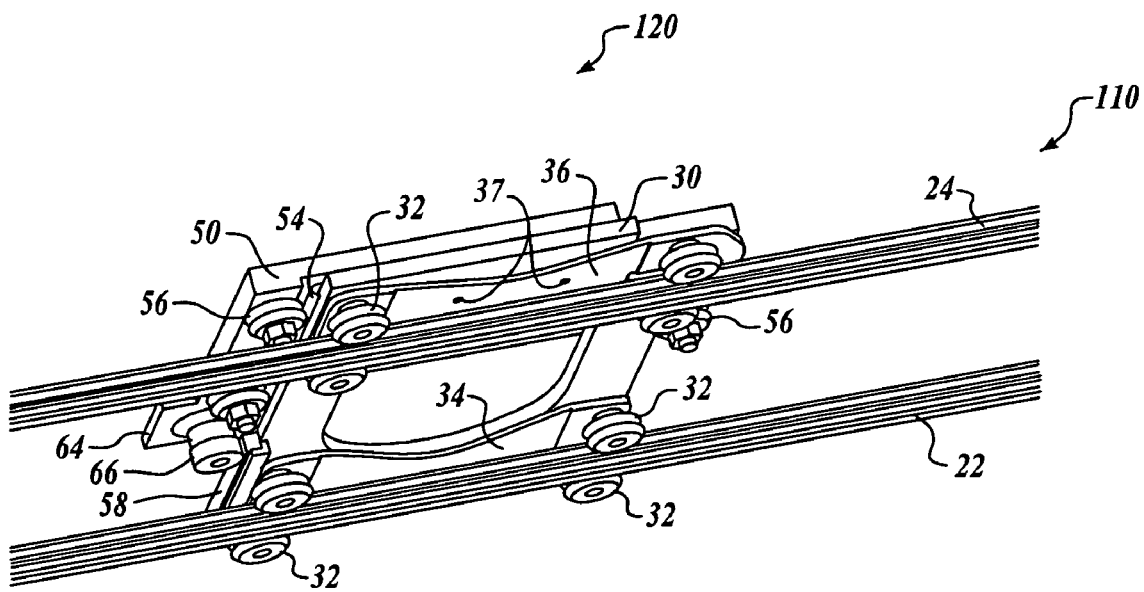
FIG. 4 is a lower isometric view of the track assembly and a portion of the carriage assembly of FIG. 2.

FIGS. 2–4 are upper and lower partial isometric views of the track assembly 110 and the carriage assembly 120 of FIG. 1 with the position sensor assembly 140 removed. In this embodiment, the track assembly 110 includes a pair of flexible rails 22 and 24, each of the rails 22 and 24 being equipped with a plurality of vacuum cup assemblies 14. The vacuum cup assemblies 14 are fluidly coupled to one or more vacuum lines 16 leading to a vacuum source 18, such as a vacuum pump or the like, such that vacuum may be controllably applied to (and removed from) the vacuum cup assemblies 14 during, for example, mounting, re-positioning, and removal of the track assembly 110 to and from the workpiece 20. The vacuum cup assemblies 14 are of known construction and may be of the type disclosed, for example, in U.S. Pat. No. 6,467,385 B1 issued to Buifrick et al., or U.S. Pat. No. 6,210,084 B1 issued to Banks et al. In alternate embodiments, the vacuum cup assemblies 14 may be replaced with other types of attachment assemblies, including magnetic attachment assemblies, bolts or other threaded attachment members, or any other suitable attachment assemblies.

As further shown in FIGS. 1–4, the rails 22, 24 preferably have a width substantially greater than their thickness such that they are substantially stiffer in bending about an axis that extends in the thickness direction (parallel to the z-axis in FIG. 2) than they are about an axis that extends in the width direction (parallel to the y-axis in FIG. 2). The rails 22, 24 are oriented approximately parallel to each other, although the lateral spacing between the rails 22, 24 can vary when the rails 22, 24 are mounted on a compound-contoured workpiece surface. Preferably, the rails 22, 24 are rigidly affixed to each other at only one end by a connecting member 28a, which fixes the lateral spacing between the rails at that end. At other locations along the rails 22, 24, the spacing between the rails 22, 24 can vary as noted. There can be another connecting member 28b at the opposite end of the rails 22, 24, but this connecting member 28b may provide a "floating" connection that allows the spacing between the rails 22, 24 to adjust as needed depending on the contour of the workpiece 20 surface.

The widths of the rails 22, 24 extend substantially parallel to the surface of the workpiece 20 when the vacuum cup assemblies 14 are attached to the workpiece surface 102. Because the rails 22, 24 may bend relatively easily about the widthwise directions and to twist about their longitudinal axes, the rails 22, 24 may flex and twist as needed to substantially follow the surface of the workpiece 20 and the vacuum cup assemblies 14 maintain each rail at a substantially constant distance from the surface of the workpiece 20. In this manner, the major surfaces of the rails 22, 24 may be substantially perpendicular to the surface normal of the workpiece 20 at any point along each rail.

With continued reference to FIGS. 1–4, mounted on the rails 22, 24 is the carriage assembly 120 that may translate along the rails 22, 24 by virtue of rollers 32 that are mounted on an x-axis carriage 30 of the carriage 120 and engage the rails 22, 24. The x-axis carriage 30 of the carriage assembly 120 in the illustrated embodiment comprises a plate-shaped member. The rollers 32 are mounted along each of the opposite side edges of the x-axis carriage 30. More particularly, spring plates 34 and 36 (best shown in FIG. 4) are attached to the x-axis carriage 30 adjacent to a lower surface thereof at each of the opposite side edges of the x-axis carriage 30. The spring plates 34, 36 are affixed to the x-axis carriage 30 at locations 37 (FIG. 4) spaced inwardly from the opposite ends of the spring plates 34, 36, such that each spring plate has two opposite end portions that are cantilevered from the x-axis carriage 30. The rollers 32 are mounted on these cantilevered end portions of the spring plates 34, 36. There are two opposing rollers 32 mounted on each cantilevered end portion of each of the spring plates 34, 36. Each rail 22, 24 is received between the opposing rollers 32. The rails 22, 24 preferably have V-shaped edges engaged by the rollers 32, and the rollers 32 are V-groove rollers having V-shaped grooves that receive the V-shaped edges of the rails 22, 24. The rollers 32 thus prevent relative movement between the rollers 32 and rails 22, 24 in the direction along the rotational axes of the rollers 32, which axes are substantially normal to the workpiece surface 102.

The spring plates 34, 36 on which the rollers 32 are mounted may flex and twist as needed (i.e. as dictated by the contour of the workpiece surface 102 as the carriage assembly 120 traverses the rails 22, 24) to allow a limited degree of relative movement to occur between the x-axis carriage 30 and the rollers 32. This is facilitated by making the spring plates 34, 36 relatively narrow at their middles and wider at their ends, so that the plates 34, 36 preferentially bend and twist at approximately the middle rather than at the ends where the rollers 32 are mounted. Thus, a limited degree of relative movement can occur between the x-axis carriage 30 and the rails 22, 24. The net result is that the x-axis carriage 30 enables the carriage assembly 120 to traverse the rails 22, 24 along the x-axis (i.e. the axis parallel to the length direction of the rails 22, 24) even though the rails 22, 24 may be bending and twisting in somewhat different ways relative to each other. In effect, the rails 22, 24 conform to the contour of the workpiece 20 and thus, the thickness direction of the rails 22, 24 is approximately normal to the surface of the workpiece 20 at any point along the path defined by the rails 22, 24. Consequently, a reference axis of the carriage assembly 120 (in the illustrated embodiment, a z-axis normal to the plane of the x-axis carriage 30) is maintained substantially normal to the workpiece 20 at any position of the carriage assembly 120 along the rails 22, 24.

As best shown in FIGS. 2 and 3, a rack 38 for a rack and pinion arrangement is mounted along the surface of the rail 24 that faces the spring plate 36, and the carriage assembly 120 includes a first motor 40 and associated gearbox 42 mounted on the spring plate 36. An output shaft from the gearbox 42 has a pinion gear 44 mounted thereon, and the spring plate 36 includes a window 46 (FIG. 3) that the pinion gear 44 extends through to engage the rack 38 on the rail 24. Thus, rotation of the pinion gear 44 by the first motor 40 drives the carriage assembly 120 along the rails 22, 24. It may be appreciated that the rail 24 having the rack 38 comprises a reference rail relative to which the x-axis positioning of the carriage assembly 120 may be performed. No attempt is necessary to determine or control the x-axis positioning of the carriage assembly 120 relative to the other rail 22.

To improve accuracy of the x-axis position of the carriage assembly 120, the pinion gear 44 may have a constant height relative to the rack 38 at any point along the reference rail 24. To accomplish this height control, the rotation axis of the pinion gear 44 may preferably lie in the same plane as that defined by the rotational axes of the two rollers 32 mounted on the end of the spring plate 36. More particularly, the axes of the rollers 32 may be substantially parallel to each other and substantially normal to the workpiece surface 102, and the axis of the pinion gear 44 may be substantially parallel to the workpiece surface 102 and may lie in the plane of the roller axes.

As further shown in FIGS. 2–4, the carriage assembly 120 further includes a y-axis carriage 50 slideably mounted atop the x-axis carriage 30 so that the y-axis carriage 50 can slide back and forth along a y-axis direction perpendicular to the x-axis direction. More particularly, rails 52, 54 are affixed to the opposite edges of the x-axis carriage 30, and rollers 56 are mounted on the y-axis carriage 50 for engaging the rails 52, 54. A rack 58 for a rack and pinion arrangement is affixed to the x-axis carriage 30 along the edge thereof adjacent to the rail 54 (see FIG. 4). A second motor 60 and associated second gearbox 62 are mounted on a plate 64 that is affixed to the y-axis carriage 50 adjacent to the rack 58. The plate 64 includes a window therethrough, and the output shaft of the second gearbox 62 extends through the window and drives a pinion gear 66 that engages the rack 58. Thus, rotation of the pinion gear 66 by the second motor 60 drives the second base member along the rails 52, 54 in the y-axis direction.

In operation, the manufacturing assembly 100 may be mounted onto the workpiece 20 and vacuum may be provided to the vacuum assemblies 14, thereby securing the track assembly 110 to the workpiece 20 in a desired position. The carriage assembly 120 may then be moved to a desired position along the track assembly 110. The controller 130 may transmit control signals to the first drive motor 40, rotating the first drive gear 44 which engages with the rack 38 to drive the carriage assembly 120 along the track assembly 110. Similarly, the controller 130 may transmit control signals to the second drive motor 60 to adjust the position of the y-axis carriage 50 relative to the x-axis carriage 30.

As shown in FIG. 2, mounted atop the y-axis carriage 50 is a clamp ring assembly 70. The clamp ring assembly 70 may be used to support and secure the position sensor assembly 140, and also to support a tool assembly 150 as shown in phantom lines in FIG. 2. The tool assembly 150 may be extended through a window in the y-axis carriage 50 (visible in FIG. 3), and through a window in the x-axis carriage 30 (visible in FIG. 4) that is elongated in the y-axis direction. The axis of the tool assembly 150 may be approximately parallel to the z-axis, and thus may be substantially normal to the workpiece 20. The tool assembly 150 may be coupled to the controller 130 via a command link 152 for controlling manufacturing operations on the workpiece 20.

It will be appreciated that the tool assembly 150 may be a drill spindle module or other drilling device suitable for performing drilling operations, including, for example, those drilling devices commercially-available from Cooper Tools, Inc. of Lexington, S.C., West Coast Industries, Inc. of Seattle, Wash., Recoules, S. A. of Ozoir-la-Ferriere, France, or Global Industrial Technologies, Inc. of Dallas, Tex. In alternate embodiments, the tool assembly 150 may be any of a wide variety of manufacturing tools, including, for example, riveters, mechanical and electromagnetic dent pullers, welders, wrenches, clamps, sanders, nailers, screw guns, routers, degreasers, washers, etchers, deburring tools, lasers, tape applicators, or virtually any other desired type of manufacturing tools or measuring instruments.

Figure 5:
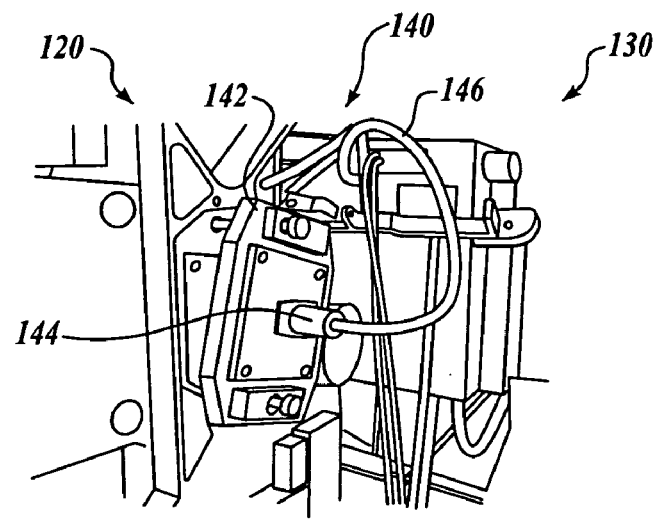
FIG. 5 is an enlarged, partial isometric view of a sensor assembly and control assembly of the manufacturing assembly of FIG. 1.

FIG. 5 is an enlarged, partial isometric view of the position sensor assembly 140 and the controller 130 of the manufacturing assembly 100 of FIG. 1. As shown in FIG. 5, the position sensor assembly 140 includes a mount 142 that is coupled to the carriage assembly 120 (e.g. to the clamp ring assembly 70), and a sensor 144 that is operatively coupled to the mount 142. A sensor link 146 is coupled between the sensor 144 and the controller 130 for transmitting and receiving signals.

Figure 6:
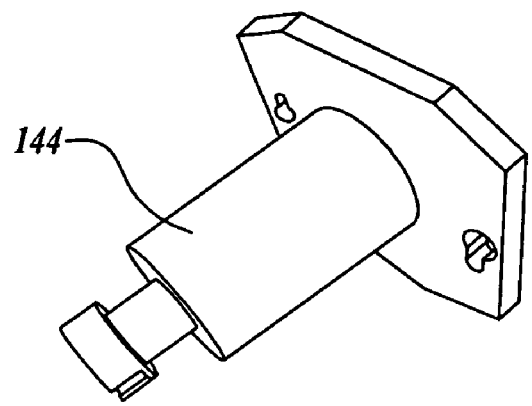
FIG. 6 is a side isometric view of a sensor of the sensor assembly of FIG. 5.
Figure 7:
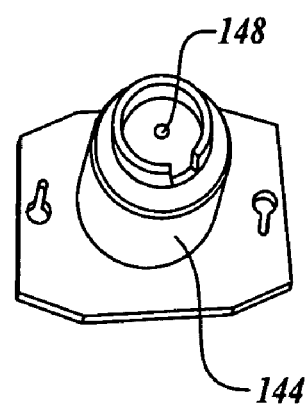
FIG. 7 is a bottom isometric view of the sensor of FIG. 6.

FIGS. 6 and 7 are side and bottom isometric views, respectively, of the sensor 144 of FIG. 5. As best shown in FIG. 7, the sensor 144 includes a sensing element 148 for transmitting signals toward the workpiece 20, and for receiving reflected signals from the workpiece 20, as described more fully below. It will be appreciated that the sensor 144 may be any suitable digital or analog sensing element, including, for example, those sensors commercially-available from Sunx, Inc. of Des Moines, Iowa, or from Keyence, Inc. of American, N.J. In one embodiment, the sensing element 148 may be a fiber optic sensing element, and in one particular embodiment, the sensing element may be a coaxial fiber optic retro-reflective sensing element. In other alternate embodiments, for example, sensor element 148 may include cameras (e.g. DVT camera vision systems), magnetic proximity sensors, or any other suitable sensor element. It will be appreciated that the signals transmitted from the sensor 144 to the workpiece 20, and reflected back from the workpiece 20 to the sensor 144, may be visible light, infrared or ultra-violet signals, acoustic signals, or any other desired type of signal.

With reference to FIGS. 1 and 5, the track assembly 110 may be secured to the workpiece 20, and the carriage assembly 120 may be used to support the position sensor assembly 140 such that the sensing element 148 is pointed toward the workpiece 20. The position sensor assembly 140 may then be employed to locate the coordinates of one or more indexing features (or reference points) located on the workpiece 20. As described more fully below, the position sensor assembly 140 provides a capability for the manufacturing assembly 100 to determine a positional orientation of the manufacturing assembly 100 based on one or more known indexing features (e.g. a hole, a fastener, a bushing, or other feature) without physical contact between the sensor assembly 140 and the workpiece 20.

In one aspect, the sensing element 148 includes a bright LED coaxial fiber optic cable that uses a lens system to focus incident or illuminating light onto the workpiece 20. In brief, the incident light may be transmitted through the center fiber of the coaxial fiber optic cable, through a lens, and may be reflected by the surface of the workpiece 20. The reflected light may then be collected through the lens and returned to a sensor amplifier through the outer portion of the coaxial fiber optic cable. The sensor amplifier may then convert the intensity of the light into an analog electrical signal. The output from the sensor amplifier may be calibrated to a focal point of the lens by reading the reflected light from a standard white reflective surface. As the scan path encounters various features on the surface, the reflected light may be analyzed and when the collected data match a defined set of parameters, a known index feature (e.g. fastener, hole, etc.) can be recognized. The signal may be read and correlated to a position on the surface by using feedback from a positioning system. This location information may then be used to position other equipment on the surface of the workpiece 20, making it possible to control a system of tools or processes, as described more frilly below.

Figure 8:
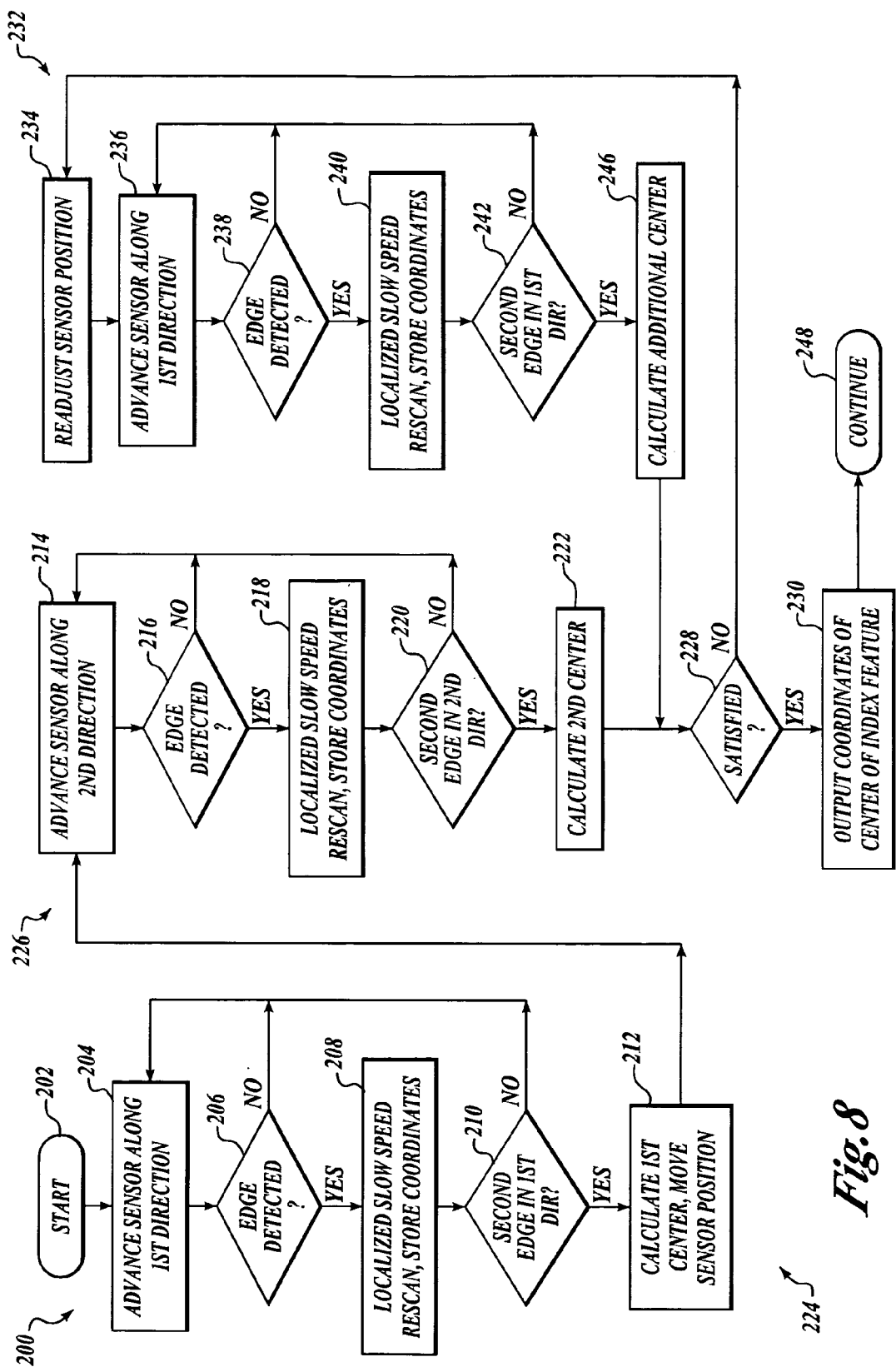
FIG. 8 is a flowchart of a method of position determination in accordance with an embodiment of the invention.
Figure 9:
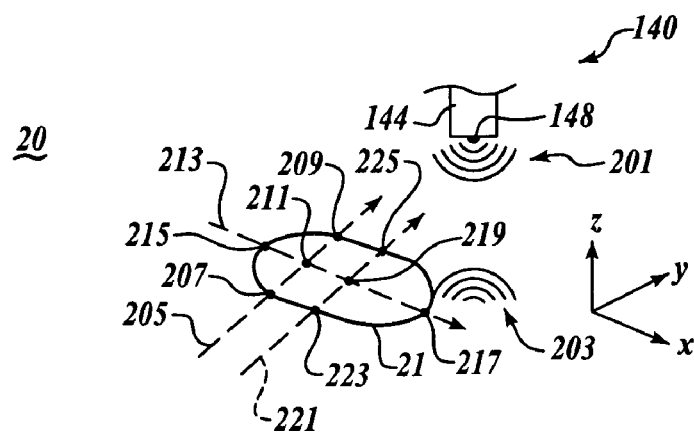
FIG. 9 is a schematic representation of the method of position determination of FIG. 8.

FIG. 8 is a flowchart showing a method 200 of position determination using the sensor assembly 140 in accordance with an embodiment of the invention. FIG. 9 is a schematic representation of the method 200 of position determination of FIG. 8. The steps of the method 200 may be implemented using known programmable or semi-programmable components and software routines. As shown in FIGS. 8 and 9, the method 200 may begin at an initial step 202 in which the position sensor assembly 140 is initially positioned proximate to an indexing feature 21 that is to be detected, such as by an operator manually positioning the carriage assembly 120 at a suitable location on the track assembly 110, and the position sensor assembly 140 begins transmitting one or more detection signals 201 onto the workpiece 20 and receiving corresponding reflected signals 203 back from the workpiece 20. Next, in step 204, the sensor 144 is either incrementally or continuously advanced along a first path 205 in a first direction (shown as the y-direction in FIG. 9).

With continued reference to FIGS. 8 and 9, as the sensor 144 is advanced along the first path 205, the method 200 continues to transmit detection signals 201 and monitor the received reflected signals 203 to determine whether a first edge 207 of the index feature 21 has been detected (step 206). If the sensor 144 is a digital sensor, the sensor 144 may indicate that the edge has been reached by providing a sensor output that transitions from a first well-defined state indicating that the sensor 144 is receiving reflected signals 203 that are reflecting from the workpiece 20, to a second well-defined state indicated that the sensor 144 is receiving reflected signals 203 that are reflecting from the index feature 21. Alternately, if the sensor 144 is an analog sensor, the sensor output may be proportional to the reflected signals 203 from the workpiece 20 and from the index feature 21, thereby providing ad indication of when the sensor 144 is over each component, respectively.

Eventually, based on the reflected signals 203, the first edge 207 (FIG. 9) of the index feature 21 may be detected (step 206). Next, in step 208, the position of the sensor 144 may be readjusted and a localized, slow speed (or small increment) rescan may be performed to determine the coordinates of the first edge 207, and the coordinates of the first edge 207 are stored. In step 210, the method 200 determines whether the edge that has just been detected is a second edge 209 (see FIG. 9) of the index feature 21, and if not, the method 200 repeats steps 204 through 208 to determine and store the coordinates of the second edge 209.

Next, in step 212, the method 200 uses the coordinates of the first and second edges 207, 209 to calculate a first center 211 along the first path 205, and repositions the sensor 144 at a location spaced apart from the index feature 21 with a value along the first direction (e.g. the y coordinate) that corresponds to the value of the first center 211. The sensor 144 is then advanced along a second path 213 (shown as the x direction in FIG. 9) in step 214, and the output from the sensor 144 is monitored to determine whether a first edge 215 of the index feature 21 along the second path 213 has been detected (step 216). After the first edge 215 along the second path 213 has been detected, as described above, the position of the sensor 144 may be readjusted and a localized, slow speed (or small increment) rescan may be performed along the second path 213 to determine the coordinates of the first edge 215, and the coordinates of the first edge 215 along the second path 213 are stored (step 218). After storing the coordinates, the method 200 next determines whether the edge that has just been detected is a second edge 217 of the index feature 21 along the second path 213 (see FIG. 9) in step 220, and if not, the method 200 repeats steps 214 through 218 to determine and store the coordinates of the second edge 217 along the second path 213. In step 222, the method 200 uses the coordinates of the first and second edges 215, 217 along the second path 213 to calculate a second center 219 (FIG. 9).

With reference to FIG. 8, steps 204 through 212 may generally be referred to as a first sweep 224 of the sensor 144, and steps 214 through 222 may be referred to as a second sweep 226 of the sensor 144. After determining the coordinates of the first and second centers 211, 219 using the first and second sweeps 224, 226, the method 200 may simply assume that the coordinates of an index center of the index feature 21 are the same as the coordinates of the second center 219. If this approach is deemed satisfactory in step 228, then the method 200 proceeds with outputting the coordinates of the center of the index feature 21 in step 230. If additional accuracy or confirmation is desired, however, the method 200 may include one or more additional sweeps 232 of the sensor 144.

As shown in FIG. 8, if an additional sweep 232 is desired, the sensor 144 is repositioned in step 234 to a location spaced apart from the index feature 21 but having the same value along the second direction (x coordinate in FIG. 9) as the second center 219. Next, the sensor 144 is advanced along a third path 213 (shown as the y direction in FIG. 9) in step 236, and the output from the sensor 144 is monitored to determine whether a first edge 223 of the index feature 21 along the third path 221 has been detected (step 236). After the first edge 223 along the third path 221 has been detected, the position of the sensor 144 may be readjusted and a localized, slow speed (or small increment) rescan may be performed along the third path 221 to determine the coordinates of the first edge 223, and the coordinates of the first edge 223 along the third path 221 are stored (step 240). After storing the coordinates, the method 200 next determines whether the edge that has just been detected is a second edge 225 of the index feature 21 along the third path 221 (step 242). If not, the method 200 repeats steps 236 through 240 to determine and store the coordinates of the second edge 225 along the third path 221. In step 246, the method 200 uses the coordinates of the first and second edges 223, 225 along the third path 221 to compute a third (or additional) center 227.

After the additional sweep 232 is conducted, the method 200 may again determine whether the desired degree of accuracy has been reached in step 228. If not, additional sweeps similar to the third sweep 232 may be conducted along, for example, different paths. If additional sweeps are not desired, then the method 200 proceeds to step 230, and the coordinates of the index center are output. The results of the third sweep 232 (or more sweeps) may provide an improved indication of the index center of the index feature 21. For example, the index center may be determined as the average of the coordinates of the second and third centers 219, 227. After the index center of the index feature 21 is output (step 230), the method 200 may continue in step 248 to the next phase of manufacturing operations.

It may be appreciated that the particular locations and directions of the first, second, and third paths 205, 213, 221 of the method 200 may be varied from the particular embodiment shown in FIG. 9, and that the present invention is not limited to the particular details described above and shown in the accompanying figure. For example, the first direction of the first path may be along the x axis, and the second direction of the second path may be along the y axis, or alternately, the first and second paths may be along any desired directions across the index feature 21. Preferably, however, the first and second paths are orthogonally oriented. It may also be appreciated that the method 200 may be better suited for locating an index center of an index feature having a round (or approximately round) shape, although other shapes of index features may be employed and detected using the apparatus and methods in accordance with the present invention.

Figure 10:
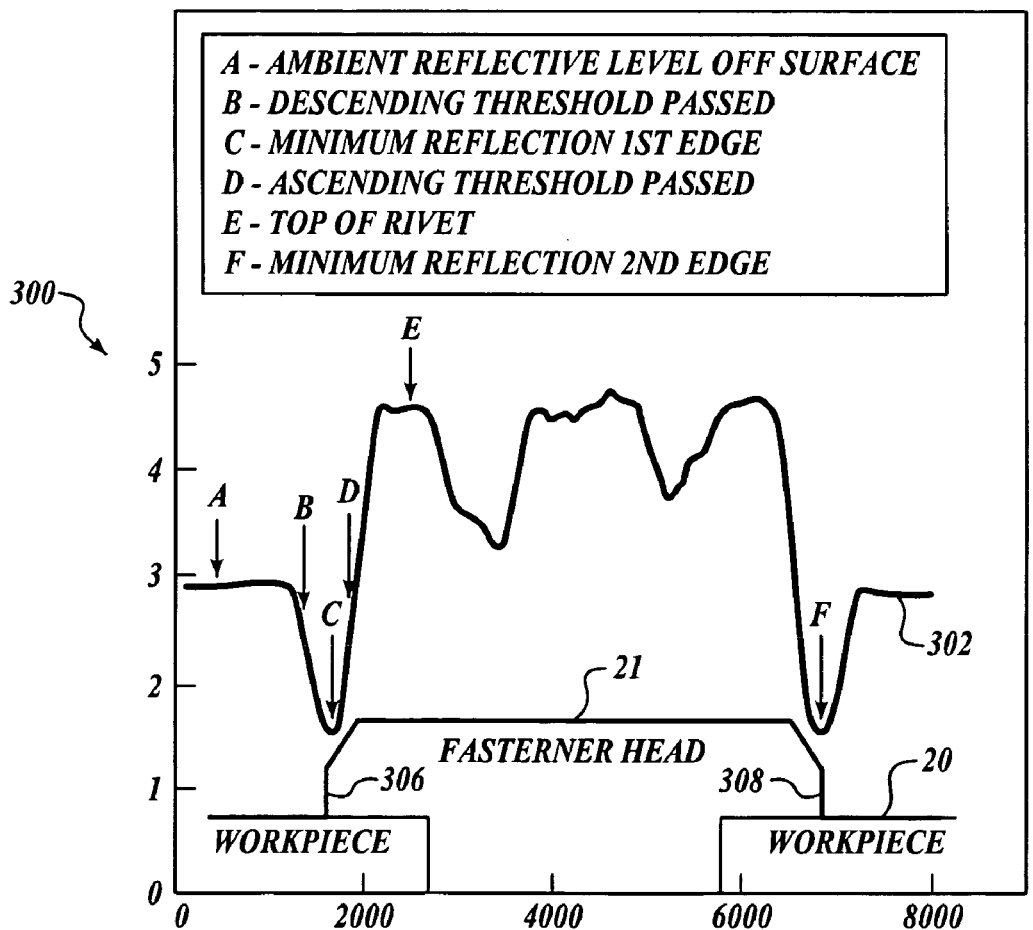
FIG. 10 is a graph of a representative signal level of a sensor sweep used to detect a position of an index feature in accordance with an embodiment of the invention.

FIG. 10 is a graph 300 of a representative sensor output signal level 302 of a sensor sweep 304 used to detect a position of an index feature 21 in accordance with an embodiment of the invention. In this embodiment, the index feature 21 is a fastener head that is raised above the surface of the surrounding workpiece 20. The signal level 302 of FIG. 10 may be provided by an analog type of sensor 144. As shown in FIG. 10, during a first portion A of a sensor sweep 304, the signal level 302 is characterized by a generally constant level as reflected signals are receive by the sensor 144 from the surface of the workpiece 20. In a second portion B, the signal level 302 is characterized by a descending level of reflected signals received by the sensor 144 as the detection signals begin to impinge on and reflect from a leading edge 306 of the fastener head 21.

As further shown in FIG. 10, as the sensor sweep 304 continues, the signal level 302 reaches a first minimum reflection value at a location C, and then enters a portion D that is characterized by an ascending signal level as an increasing level of reflected signals are received by the sensor 144. Next, the signal level generally levels off during a next portion E of the sensor sweep 304 as the sensor 144 begins receiving a relatively constant level of reflected signals from the top of the fastener head 21. Continuing the sensor sweep 304 across the top of the fastener head 21 to a trailing edge 308 of the fastener head 21, the signal level 302 eventually is characterized by a relatively substantial descent to a second minimum reflection level at a location F, and then rises again to an ambient reflection level characteristic of reflections from the surface of the workpiece 20. In one embodiment, the method 200 described above with reference to FIGS. 8 and 9 performs the above-referenced edge determinations (steps 206, 208, 216, 218, 238, and 240) by assigning the coordinates of the sensor 144 corresponding to the locations of the first and second minimum reflection levels (locations C and F) as being the coordinate positions of the first and second edges for each of the paths 205, 213, 221.

More specifically, the leading and trailing edges 306, 308 may be computed from the signal level 302 by first computing an ambient reflectivity level (portion A), such as by computing a running average of the sensor level 302. During the sensor sweep 304, as the sensor level 302 drops below a predetermined threshold, such as a predetermined percentage of the ambient reflectivity level, an edge detection procedure may be invoked. The edge detection procedure may store the minimum sensor value (location C) corresponding to the leading edge 306 and the position coordinates thereof, and may also store the same information from the minimum sensor value corresponding to the trailing edge 308 (location F). A center may then be mathematically computed from the positions of the two minimum sensor values (locations C and F).

It will be appreciated that the characteristics of the sensor level may vary, and that various index features may provide sensor levels having different shapes, trends, and characteristics than that shown in the graph 300 of FIG. 10. Similarly, it may be desirable to monitor different aspects of the sensor level other than the locations of the minimum sensor values, such as, for example, the derivative (or slope) of the sensor levels. In one alternate embodiment, for example, the index feature may be a bushing having a concave rolled edge. For such a bushing, the edges of the bushing may be more readily determined by monitoring a derivative of the sensor level (e.g. with respect to the distance traveled by the sensor 144) during a sensor sweep over the bushing. In that case, the peaks or maxima of the derivative values may be representative of the rate of change of the profile of the surfaces over which the sensor 144 is swept, effectively shifting the pattern in time by a constant of differentiation.

In operation, the position sensor assembly 140 may be employed to determine the locations of one or more index features 21 on the workpiece 20, thereby precisely defining the position of the manufacturing assembly 100 on the workpiece 20. This information may then be stored in a memory device of the controller 130. After the position sensor assembly 140 has been employed for this purpose, the position sensor assembly 140 may be removed from the carriage assembly 120, and the tool assembly 150 may be installed on the carriage assembly 120. Using command and control information stored in its memory device, the controller 130 may then autonomously control the carriage assembly 120 and the tool assembly 150 to perform the desired manufacturing operations at the desired locations on the workpiece 20. Different tool assemblies may be interchanged to and from the carriage assembly 120 to perform different manufacturing operations as desired.

Manufacturing assemblies having the position sensor assembly in accordance with the teachings of the present invention may advantageously improve the quality and efficiency of manufacturing operations on a workpiece. The position sensor assembly may provide a relatively fast, automated method of precisely locating the manufacturing assembly on the workpiece using an indexing feature that may already be part of the workpiece or the structure. The need for physical contact index points, the accuracy of which may become degraded, is thereby reduced or eliminated. The need to precisely position the track assembly on the workpiece at the start of manufacturing operations is also reduced or eliminated. The position sensor may accurately determine the location of the manufacturing assembly on the workpiece, and the data corresponding to the desired locations of the manufacturing operations (e.g. the hole pattern for a plurality of drilling operations) which are stored in memory may simply be rotated or transformed in machine space into proper alignment and orientation with the actual location of the track assembly on the workpiece using standard transformation matrix algorithms. In this way, the accuracy, consistency, and efficiency of the manufacturing operations on the workpiece may be improved, and the costs associated with performing, inspecting, and reworking the workpiece may be reduced.

The manufacturing assembly 100 having the position sensor assembly 140 further provides the capability to detect an index feature on the workpiece 20 without the need for physical contact between contact sensors, feeler gauges, or other physical contact devices on the carriage assembly 120 and corresponding contact features on the workpiece 20. The sensor element may detect the index feature from a distance away from the index feature, thereby eliminating any need for physical contact between the sensor element and the index feature. Because there is no physical contact, the position sensor assembly may provide improved performance over alternate sensor systems that require physical contact and that may be bent, damaged, or otherwise degraded during transport, storage, or during the performance of manufacturing operations. In this way, the position sensor assembly may improve the accuracy of the manufacturing processes, and may reduce the labor associated with the process of orienting the manufacturing assembly on the workpiece. Also, the position sensor assembly may advantageously reduce or eliminate the possibility of damage to the surface of the workpiece that may otherwise be caused by physical contact with the surface, reducing the need for repairs and reworking of the workpiece. Thus, the overall efficiency and throughput of the manufacturing operation may be improved.

It may be appreciated that a variety of alternate embodiments of apparatus and methods may be conceived in accordance with the present invention, and that the invention is not limited to the particular apparatus and methods described above and shown in the accompanying figures. For example, it may be noted that the carriage assembly 120 and the track assembly 110 may assume a wide variety of alternate embodiments, including, for example, the rail and carriage assemblies taught by U.S. Pat. No. 4,850,763 issued to Jack et al, and any of the carriage assemblies and track assemblies disclosed in co-pending, commonly owned U.S. patent application Ser. No. 10/016,524, which application is incorporated herein by reference.

Figure 11:
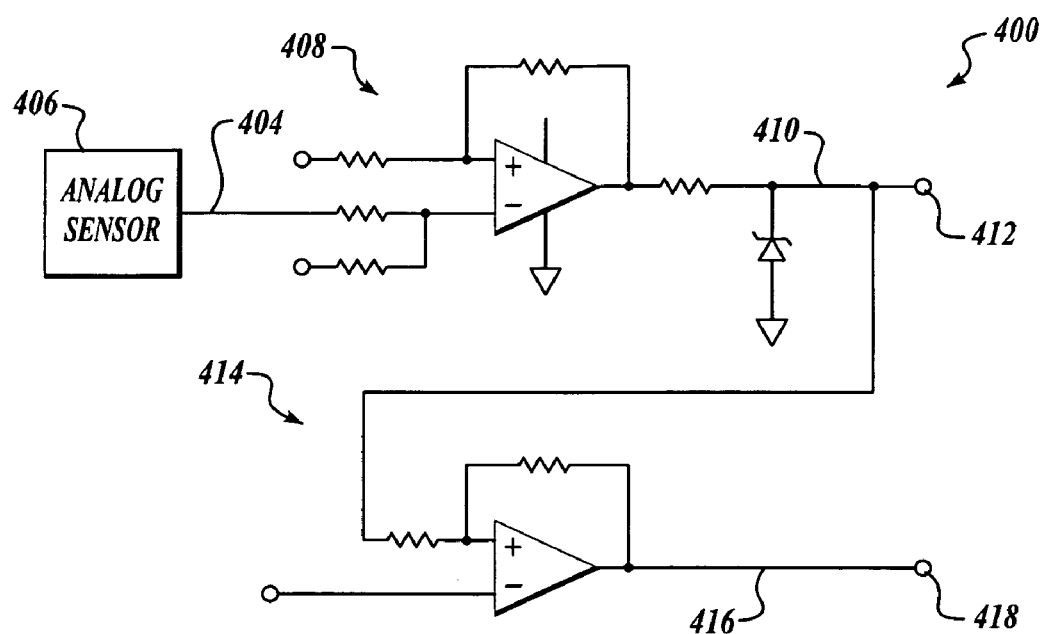
FIG. 11 is a control circuit for performing a position determination in accordance with another alternate embodiment of the invention.

In another aspect, a control circuit 400 may be employed that receives and enhances an output signal of an analog sensor of the position sensor assembly 140. For example, FIG. 11 is a sensing circuit 400 for performing a position determination in accordance with another alternate embodiment of the invention. In this embodiment, the sensing circuit 400 includes a comparator-stage whereby an output signal 404 of an analog sensor 406 is made to function as a digital proximity sensor simultaneously with its use as an analog sensor. As shown in FIG. 11, the output signal 404 is fed into a first circuit portion 408 configured to provide a gain and level shift stage. The first circuit portion 408 may provide an optimal response for different types of workpiece surfaces. A conditioned analog signal 410 output by the first circuit portion 408 is provided to the controller 130 on an analog output node 412. Similarly, the conditioned analog signal 410 output by the first circuit portion 408 is provided as an input to a second circuit portion 414. The second circuit portion 414 is configured as a threshold comparator stage which trips above or below a given signal voltage, providing an appropriate digital signal 416 on a digital output node 418. The gain, offset, and threshold values of the sensing circuit 400 may be predetermined constants, or may be programmable by the controller 130 according to varying operating conditions.

Manufacturing assemblies that includes the sensing circuit 400 may provide improved position accuracy over alternate systems. Because the sensing circuit 400 may receive an analog signal from the sensing element and provides both a conditioned analog output and a digital output, the sensing circuit may provide a capability of cross-checking the results of the position detection of an index feature by enabling the controller to compare and utilize both analog and digital output signals. The sensing circuit 400 may also provide improved versatility by enabling the position sensor assembly to be utilized with both analog or digital controllers or other desired electronic components.

It may be appreciated that the various operations of the manufacturing assembly 100 may be controlled by the controller 130, including the positioning of the carriage assembly 120 on the track assembly 110, the operations of the position sensor assembly 140, and the positioning and engagement of the tool assembly 150 with respect to the workpiece 20. These operations may be accomplished in an automated or semi-automated manner using the controller 134 equipped with computerized numerically-controlled (CNC) methods and algorithms. Alternately, the positioning may be performed manually or partially-manually by an operator, such as, for example, by having the operator provide manual control inputs to the controller 134, or by temporarily disabling or neutralizing the above-referenced motors and actuators of the carriage and clamp-up assemblies 120, 160 to permit manual movement.

Typically, to provide a desired degree of positional accuracy for performing manufacturing operations, the index centers of two index features 21 may be determined using the methods and apparatus described above. After the one or more index centers of the index features 21 have been determined, control algorithms of the manufacturing assembly 100 may be used to transform a data pattern stored in a memory of a control system (e.g. in the controller 130) into machine space for controlling the manufacturing operations performed by the manufacturing assembly 100 on the workpiece 20. These transformations may be performed using standard, well-known mathematical algorithms commonly employed in presently-existing CNC machining processes.

Referring again to FIGS. 1 and 5, in yet another aspect, the controller 130 may include an entire CNC control system. For example, in one particular embodiment, the controller 130 includes an 8-axis servo-controller, and a plurality of servo-amplifiers, servo-motors, and air solenoids. Because the controller 130 is attached directly to the carriage assembly 120 (e.g. to the y-axis carriage 50), the controller 130 travels with the carriage assembly 120 during the performance manufacturing operations. Thus, the links or cables between the controller 130 and the other components of the manufacturing assembly 100 for transmitting control signals to (and receiving feedback signals from) the drive motors 40, 60 of the carriage assembly 120, the position sensor assembly 140, the tool assembly 150, and any other components of the manufacturing assembly, are greatly reduced or eliminated. A controller umbilical 132 (FIG. 1) may provide control air, electrical power, and communication cables from a supply unit 134 to the controller 130. Alternately, the controller umbilical 132 may also provide high-volume fluid (e.g. air or hydraulics) for powering the tool assembly 150.

The manufacturing assembly 100 having the controller 130 mounted to the carriage assembly 120 may further improve the efficiency and throughput of the manufacturing operations. Because the controller 130 is mounted on the carriage assembly 120, the amount of cables extending between the controller 130 and the portions of the carriage assembly (e.g. the drive assembly, the position sensor assembly, etc.) and the tool assembly 150 may be reduced compared with prior art manufacturing assemblies. Thus, the manufacturing assembly may provide improved mobility of the carriage assembly over the track assembly because the movement of the carriage assembly is not limited by the lengths of the control cables extending between the carriage assembly to a remotely-located controller, or by the mobility of a remotely-located controller within the confines of the manufacturing environment. The combination of the carriage assembly 120 and the controller 130 may even allow for a single operator to move these components between various locations to conduct manufacturing operations at different locations or on different workpieces, thereby further improving the efficiency and throughput of the manufacturing process.

Figure 12:
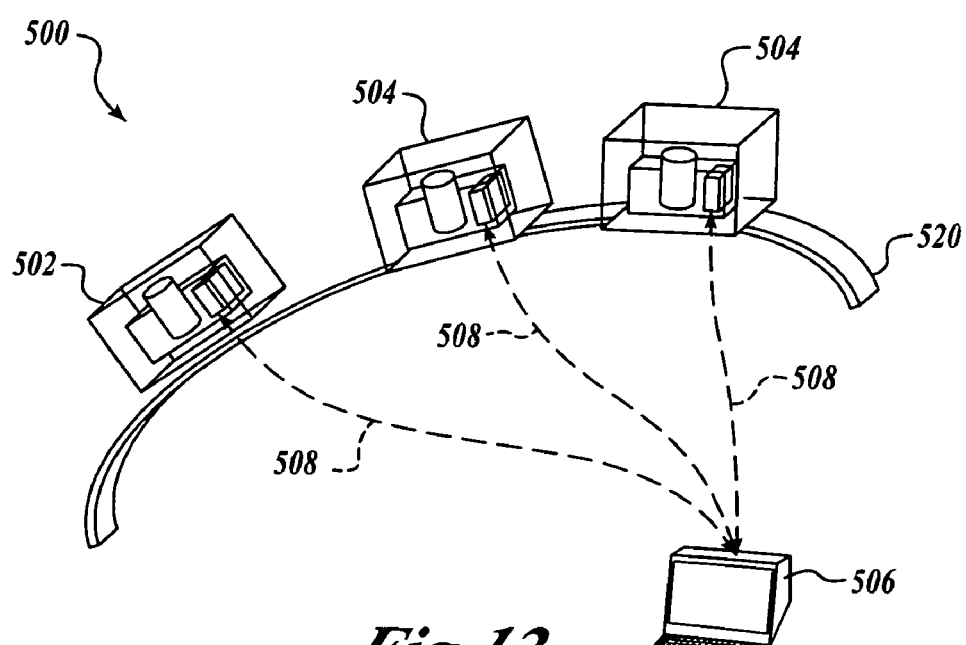
FIG. 12 is a schematic representation of a manufacturing assembly in accordance with yet another embodiment of the invention.

FIG. 12 is a schematic representation of a manufacturing assembly 500 in accordance with yet another embodiment of the invention. In this embodiment, the manufacturing assembly 500 includes a sensor unit 502 and a pair of tool units 504 operating on a track assembly 110 (not visible) that is coupled to a contoured workpiece 520. The sensor and tool units 502, 504 each include a carriage assembly as described above. The sensor unit 502 also includes a position sensor assembly 140, while the tool units 504 include a tool assembly 150. The sensor and tool units 502, 504 are operatively coupled to a master controller 506, such as by wireless or hardwired communication links 508. The sensor and tool units 502, 504 may also include a controller 130, as described above.

In operation, each of the sensor and tool units 502, 504 may operate autonomously under the control of their respective controllers 130, or semi-autonomously under the control of both the controller 130 and the master controller 506, or may be fully controlled by the master controller 506. In one embodiment, the sensor unit 502 may perform the function of locating various indexing features distributed over the workpiece 520 in the manner described above, which information may be transmitted to the master controller 506. The master controller 506 may then provide command and control signals to one or more tool units 504 to precisely position the tool units 504 and to perform the desired manufacturing operations on the workpiece 520. Alternately, the locations of the indexing features may be transmitted from the sensor unit 502 directly to one or more of the tool units 504, and the tool units 504 may operate autonomously to perform the desired manufacturing operations at the appropriate locations on the workpiece 520. After locating the indexing features on a first portion of the workpiece 520, the sensor unit 502 may move automatically to a next portion, or may be commanded to proceed to the next portion of the workpiece 520 by the master controller 506 to make room for the tool units 504 or to locate additional index features.

The manufacturing assembly 500 may further improve the efficiency and throughput of manufacturing operations. As noted above, because the controller 130 of each unit 502, 504 is mounted to the carriage assembly 120, the number of cables and wires associated with each unit 502, 504 may be reduced, thereby improving the mobility of each unit over the workpiece 520. Because the need for cables extending between each of the units 502, 504 and a remotely-located controller may be reduced, the number of different units 502, 504 that may be located and operated in relatively close proximity on a single track assembly may be increased. Thus, the efficiency and throughput of manufacturing operations may be improved.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A method of performing a manufacturing operation on a workpiece, the method comprising:

supporting a manufacturing assembly proximate a surface of the workpiece, the manufacturing assembly including a sensing element that is operatively positioned relative to and spaced apart from the workpiece, the sensing element being moveable relative to the surface of the workpiece;

moving the sensing element along a first path that crosses an index feature on the workpiece; and detecting at least one edge of the index feature on the workpiece from a distance away from the index feature; and wherein supporting a manufacturing assembly proximate a surface of the workpiece includes supporting a manufacturing assembly having a controller operatively coupled to the sensing element, and wherein moving the sensing element along a first path includes transmitting at least one control signal from the controller.

2. The method of claim 1, wherein detecting at least one edge of an index feature on the workpiece from a distance away from the index feature includes detecting a reflected electromagnetic signal reflected from the index feature.

3. The method of claim 1, wherein detecting at least one edge of an index feature on the workpiece from a distance away from the index feature occurs simultaneously with moving the sensing element along the first path.

4. The method of claim 1, wherein detecting at least one edge of an index feature includes detecting first and second edges of the index feature along the first path, the method further comprising computing a midpoint location based on the first and second edges.

5. The method of claim 4, further comprising detecting third and fourth edges of the index feature along a second path of movement of the position sensor, and computing an estimated center of the index feature based on the first, second, third, and fourth edges.

6. The method of claim 1 wherein supporting a manufacturing assembly proximate a surface of the workpiece includes supporting a manufacturing assembly having a drive assembly operable to move the sensing element relative to the workpiece, and further having a controller mounted on the carriage assembly and operatively coupled to the drive assembly.

7. The method of claim 1, further comprising providing at least one output signal indicating a location of the at least one edge of the index feature.

8. The method of claim 7, wherein providing at least one output signal includes providing an analog output signal.

9. The method of claim 8, wherein providing an analog output signal includes applying a gain and level shift of an analog input signal to provide a conditioned analog output signal.

10. The method of claim 9, wherein providing at least one output signal further includes providing a digital output signal.

11. The method of claim 10, wherein providing a digital signal includes providing a first digital output signal when the conditioned analog output signal is below a threshold level, and providing a second digital output signal when the conditioned analog output signal is above the threshold level.

12. The method of claim 1, wherein supporting a manufacturing assembly proximate a surface of the workpiece includes supporting a manufacturing assembly having a tool assembly engageable with the workpiece, the method further comprising operatively engaging the tool assembly with the workpiece.

13. A method of performing a manufacturing operation on a workpiece, the method comprising:
supporting a manufacturing assembly proximate a surface of the workpiece, the manufacturing assembly including a sensing element that is operatively positioned relative to and spaced apart from the workpiece, the sensing element being moveable relative to the surface of the workpiece;
moving the sensing element along a first path that crosses an index feature on the workpiece;
detecting at least one edge of the index feature on the workpiece;
providing a conditioned analog output signal indicating a location of the at least one edge of the index feature; and
providing a digital output signal indicating the location of the at least one edge of the index feature.

14. The method of claim 13, wherein providing an analog output signal includes applying a gain and level shift of an analog input signal to provide the conditioned analog output signal.

15. The method of claim 13, wherein providing a digital signal includes providing a first digital output signal when the conditioned analog output signal is below a threshold level, and providing a second digital output signal when the conditioned analog output signal is above the threshold level.

16. The method of claim 13, wherein providing detecting at least one edge of an index feature on the workpiece includes detecting at least one edge of an index feature on the workpiece from a distance away from the index feature.

17. The method of claim 16, wherein detecting at least one edge of an index feature on the workpiece from a distance away from the index feature occurs simultaneously with moving the sensing element along the first path.

18. The method of claim 16, wherein detecting at least one edge of an index feature on the workpiece from a distance away from the index feature includes detecting a reflected electromagnetic signal reflected from the index feature.

19. The method of claim 13, wherein detecting at least one edge of an index feature includes detecting first and second edges of the index feature along the first path, the method further comprising computing a midpoint location based on the first and second edges.

20. The method of claim 19, further comprising detecting third and fourth edges of the index feature along a second path of movement of the position sensor, and computing an estimated center of the index feature based on the first, second, third, and fourth edges.

21. The method of claim 13, wherein supporting a manufacturing assembly proximate a surface of the workpiece includes supporting a manufacturing assembly having a controller operatively coupled to the sensing element, and wherein moving the sensing element along a first path includes transmitting at least one control signal from the controller.

22. The method of claim 13, wherein supporting a manufacturing assembly proximate a surface of the workpiece includes supporting a manufacturing assembly having a drive assembly operable to move the sensing element relative to the workpiece, and further having a controller mounted on the carriage assembly and operatively coupled to the drive assembly.

23. The method of claim 13, wherein supporting a manufacturing assembly proximate a surface of the workpiece includes supporting a manufacturing assembly having a tool assembly engageable with the workpiece, the method further comprising operatively engaging the tool assembly with the workpiece.

24. A method of performing a manufacturing operation on a workpiece, the method comprising:
supporting a manufacturing assembly proximate a surface of the workpiece, the manufacturing assembly including a track assembly attached to the workpiece and a carriage assembly moveably coupled to the track assembly, the carriage assembly having a drive assembly operable to translate the carriage assembly along the track assembly, the manufacturing assembly further including a controller mounted on the carriage assembly and operatively coupled to the drive assembly, and a sensing element that is operatively positioned relative to and spaced apart from the workpiece, the sensing element being moveable relative to the surface of the workpiece;

providing control signals from the controller to the drive assembly to move the sensing element along a first path that crosses an index feature on the workpiece; and detecting at least one edge of the index feature on the workpiece from a distance away from the index feature.

25. The method of claim 24, wherein supporting a manufacturing assembly proximate a surface of the workpiece includes supporting a manufacturing assembly having a sensing element operatively positioned relative to and spaced apart from the workpiece.

26. The method of claim 24, wherein the drive assembly is further adapted to move the sensor element relative to the carriage assembly.

27. The method of claim 26, further comprising providing second control signals from the controller to the drive assembly to move the sensor element relative to the carriage assembly.

28. The method of claim 24, wherein detecting at least one edge of an index feature on the workpiece occurs simultaneously with moving the sensing element alone the first path.

29. The method of claim 24, wherein detecting at least one edge of an index feature on the workpiece includes detecting a reflected electromagnetic signal reflected from the index feature.

30. The method of claim 24, wherein detecting at least one edge of an index feature includes detecting first and second edges of the index feature along a first path, the method further comprising computing a midpoint location based on the first and second edges.

31. The method of claim 30, further comprising detecting third and fourth edges of the index feature along a second path, and computing an estimated center of the index feature based on the first, second, third, and fourth edges.

32. The method of claim 24, wherein detecting at least one edge of an index feature includes providing a conditioned analog output signal indicating a location of the at least one edge of the index feature; and providing a digital output signal indicating the location of the at least one edge of the index feature.

33. The method of claim 32, wherein providing an analog output signal includes applying a gain and level shift of an analog input signal to provide the conditioned analog output signal.

34. The method of claim 32, wherein providing a digital signal includes providing a first digital output signal when the conditioned analog output signal is below a threshold level, and providing a second digital output signal when the conditioned analog output signal is above the threshold level.

35. The method of claim 24, wherein supporting a manufacturing assembly proximate a surface of the workpiece includes supporting a manufacturing assembly having a tool assembly engageable with the workpiece, the method further comprising operatively engaging the tool assembly with the workpiece.

* * * * *